United States Patent [19]

Kennedy et al.

[11] Patent Number: 4,707,459

[45] Date of Patent: Nov. 17, 1987

[54] REACTING-BONDED SILICON CARBIDE SPHEROIDS AND PROCESS OF MAKING

[75] Inventors: Peter Kennedy, Broughton; John O. Ware, Lea, both of England

[73] Assignee: United Kingdom Atomic Energy Authority, London, England

[21] Appl. No.: 668,808

[22] Filed: Nov. 6, 1984

[30] Foreign Application Priority Data

Dec. 19, 1983 [GB] United Kingdom ................ 8333792

[51] Int. Cl.$^4$ ............................................. C04B 35/52
[52] U.S. Cl. ........................................ 501/90; 264/13; 264/122; 423/345
[58] Field of Search .................. 264/9, 11, 13, 15, 57, 264/109, 122; 423/345, 346; 501/90

[56] References Cited

U.S. PATENT DOCUMENTS

| | | | |
|---|---|---|---|
| 2,938,807 | 5/1960 | Andersen | 423/345 |
| 2,964,823 | 12/1960 | Fredriksson | 264/65 |
| 3,233,011 | 2/1966 | Kurz et al. | 264/13 |
| 3,272,893 | 9/1966 | Mogensen | 264/14 |
| 3,384,687 | 5/1968 | Flack et al. | 264/13 |
| 3,416,888 | 12/1968 | Notari | 264/13 |
| 3,480,395 | 11/1969 | McMullen et al. | 264/57 |
| 3,845,179 | 10/1974 | Wace | 264/14 |
| 3,957,933 | 5/1976 | Egli et al. | 264/14 |
| 3,970,580 | 7/1976 | Zimmer | 264/13 |
| 4,301,132 | 11/1981 | Kennedy | 423/345 |
| 4,407,967 | 10/1983 | Luks | 264/13 |
| 4,526,734 | 7/1985 | Enomoto | 264/13 |

FOREIGN PATENT DOCUMENTS

| | | | |
|---|---|---|---|
| 1596303 | 8/1981 | United Kingdom | 423/345 |
| 2081240 | 2/1982 | United Kingdom | 423/345 |

*Primary Examiner*—Jan H. Silbaugh
*Assistant Examiner*—Mary Lynn Fertig
*Attorney, Agent, or Firm*—Larson and Taylor

[57] ABSTRACT

A method of producing spheroids comprising a coherent mixture of carbon and silicon carbide powders for subsequent siliconizing and if desired grinding to improve their sphericity, involves the steps of preparing a slip consisting essentially of a suspension of silicon carbide and carbon powders in a liquid, and introducing drops of the slip into a medium in which the drops form individual solid casts. The said liquid may be water to which a dispersant (which may be a deflocculent) has been added. Sodium alginate may advantageously be added to the slip. The said medium may be an aqueous solution of an electrolyte such as a calcium salt. An organic liquid phase, immiscible with the electrolyte, may be provided on the surface thereof. Examples of organic liquid are petroleum ether, kerosene, and cyclohexanol.

11 Claims, No Drawings

REACTING-BONDED SILICON CARBIDE SPHEROIDS AND PROCESS OF MAKING

BACKGROUND OF THE INVENTION

1. Field of the Invention

This invention relates to the production of reaction-bonded silicon carbide spheroids. 2. Description of the Background Reaction-bonded silicon carbide bodies may be produced by reaction sintering of a coherent mixture of carbon and silicon carbide powders in the presence of molten silicon so that the carbon in the mixture is converted to bonding silicon carbide and a substantially continuous silicon carbide matrix is formed in a substantially continuous free silicon phase.

SUMMARY OF THE INVENTION

According to the present invention, a method of producing spheroids comprising a coherent mixture of carbon and silicon carbide powders for subsequent siliconising, involves preparing a slip consisting essentially of a suspension of silicon carbide and carbon powders in a liquid, and introducing drops of the slip into a medium in which the drops form individual solid casts.

The spheroids formed in accordance with the invention may be siliconised in a known manner and may then be ground, if necessary, to improve their sphericity, for example, for use as ball bearings.

Other objects, advantages and features of the present invention will become apparent to those skilled in the art from the following discussion.

DESCRIPTION OF THE PREFERRED EMBODIMENTS

To provide the slip the carbon/silicon carbide powders are preferably dispersed in water to which a dispersant has been added. Commercially available deflocculents such as Dispex are suitable.

The slip should include sodium alginate as an aid to stabilising the drops.

It is considered that formation of a solid cast from the carbon/silicon carbide slip is best effected in an aqueous solution of an electrolyte. The effectiveness of the electrolyte as a flocculent will normally increase with the charge on the cations in the electrolyte. Aqueous calcium chloride solution provides a satisfactory electrolyte. With such a solution and sodium alginate present in the slip, there is an increase in the rigidity of the spheroids as they fall through the solution because of the formation of relatively insoluble calcium alginate by ion exchange between the calcium chloride and the sodium alginate. Similar ion exchange reactions will occur with solutions of other calcium salts.

An organic liquid phase layer is preferably provided on the surface of the electrolyte, the organic liquid being immiscible with the electrolyte. This layer assists in the formation of spherical drops and cushions the fall of the drops into the electrolyte, thereby limiting their deformation.

A preferred organic liquid is petroleum ether but kerosene and cyclohexanol have also been found suitable. The size of the spheroids produced depends on the size of the nozzle by which the drops are introduced into the organic liquid and also, if the drops are released beneath the surface of the organic liquid, on the relationship of the density of the selected organic liquid to the density of the slip. Spheroids ranging in diameter from 1 to 5 mm have been produced by the process described in the following example.

Having now generally described this invention, the same will be better understood by reference to certain specific examples, which are included herein for purposes of illustration only and are not intended to be limiting of the invention or any embodiment thereof, unless so specified.

EXAMPLE

A slip is made up containing:

| | |
|---|---|
| Carbon black | 40 gm |
| Silicon carbide powder passing 1200 BSS mesh | 100 gm |
| Water | 74 gm |
| Dispex G40 | 0.25 gm |
| Sodium alginate | 1.0 gm |

The carbon black and silicon carbide powder are first dry blended in a ball mill for about two hours and the dry mix is added to the water containing the Dispex G40 as deflocculant. This mixture is ball-milled with the sodium alginate for a further two hours to break up agglomerates and form a uniform slip which is passed through a sieve to remove any remaining lumps before dropping the slip through a 2 mm diameter nozzle into a column containing an upper layer of kerosene and a lower layer of a 3 molar solution of calcium chloride in water. 4 mm spheroids collect at the bottom of the column. On drying and siliconising 3.5 mm spheroids of self-bonded silicon carbide of density 3.08 g/ml are produced.

The siliconised spheroids may, as hereinbefore mentioned, be ground to improve their sphericity and may then, for example, be employed as ball bearings. In another example they may be employed as balls for ball-point writing instruments.

The invention now being fully described, it will be apparent to one of ordinary skill in the art that many changes and modifications can be made thereto without departing from the spirit or scope of the invention as set forth herein.

We claim:

1. A method of producing silicon carbide-carbon spheroids, said method comprising
    preparing a slip consisting essentially of an aqueous suspension of silicon carbide and carbon powders and a dispersant, said dispersant being present in an amount effective to prevent flocculation;
    introducing drops of the slip into an aqueous solution of an electrolyte, said electrolyte being present in an amount effective to flocculate the silicon carbide and carbon powders and form individual solid spheroids comprising a coherent mixture of silicon carbide and carbon; and
    allowing the solid spheroids to precipitate.
2. The method of claim 1, wherein
    the electrolyte present in the aqueous solution into which the drops are introduced is a calcium salt.
3. The method of claim 1, further comprising
    providing an organic liquid layer on the surface of the aqueous solution of an electrolyte, said organic liquid being substantially immiscible with said aqueous solution.
4. The method of claim 3, wherein the organic liquid is selected from the group consisting of petroleum ether, kerosene and cyclohexanol.

5. The method of claim 1, further comprising siliconizing the solid spheroids.

6. The method of claim 5, further comprising grinding the siliconized solid spheroids to improve their spericity.

7. Spheroids obtained by the method of claim 1.

8. Spheroids obtained by the method of claim 5.

9. Spheroids obtained by the method of claim 6.

10. A method of producing silicon carbide-carbon spheroids, said method comprising preparing a slip consisting essentially of an aqueous suspension of silicon carbide and carbon powders, an amount of at least one dispersant effective to prevent flocculation, and sodium alginate;

introducing drops of the slip into an aqueous solution of an electrolyte; said electrolyte being present in an amount effective to flocculate the silicon carbide and carbon powders and form individual solid spheroids comprising a coherent mixture of silicon carbide and carbon, and said sodium alginate being present in an amount effective to increase the rigidity of the solid silicon carbide-carbon spheroids as they precipitate; and allowing the solid spheroids of increased rigidity to precipitate.

11. The method of claim 10, wherein the calcium salt present in the aqueous solution into which the drops are introduced is calcium chloride; and the sodium alginate is added to the aqueous suspension of silicon carbide and carbon powders and the dispersant in an amount effective to form substantially insoluble calcium alginate in the presence of the calcium chloride.

* * * * *